Oct. 12, 1926. 1,602,994

G. VIGO

MEANS FOR CONTROLLING ELECTRIC CIRCUITS IN AUTOMOTIVE VEHICLES

Filed May 12, 1925

Inventor:
Giovanni Vigo,
By Bruce Townsend & Brickenstein
Attorneys.

Patented Oct. 12, 1926.

1,602,994

UNITED STATES PATENT OFFICE.

GIOVANNI VIGO, OF TURIN, ITALY.

MEANS FOR CONTROLLING ELECTRIC CIRCUITS IN AUTOMOTIVE VEHICLES.

Application filed May 12, 1925, Serial No. 29,749, and in Italy February 23, 1925.

The present invention has for its object a device enabling the driver of a motor vehicle to actuate by his foot an electric apparatus as an electric warner, horn or the like, without removing said foot from the pedal controlling the transmission gear or the brakes, as usually found in motor cars.

The device according to the present invention comprises a contact member arranged on one side of said pedal, and the operator is thus able to actuate said contact device by shifting his foot sidewise on the pedal plate, without removing it from the same.

On the annexed drawing are shown by way of example embodiments of the present invention, and Figure 1 is a perspective general view of the foot board of a motor car with pedals one of which is provided with a contact member according to the present invention;

Figure 1:
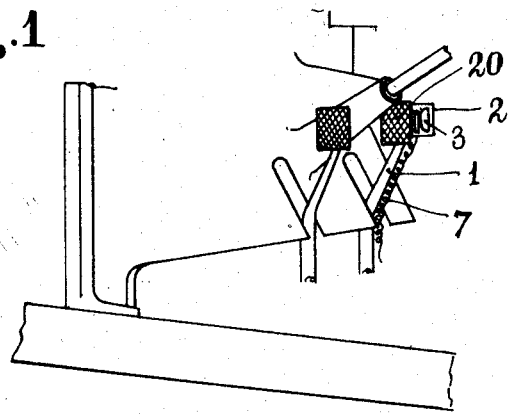

As shown in Figure 1, one of the car mechanism controlling pedals, as pedal 1, has a side extension 2 flushing with the pedal plate surface, and on said extension is mounted to move a knob 3 which projects above the surface of the pedal plate 20.

Figure 2:
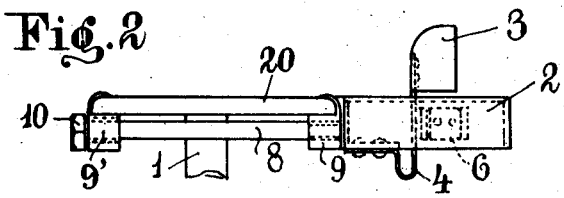
Figure 2 is an edge view of a pedal provided with said contact member.
Figure 3:
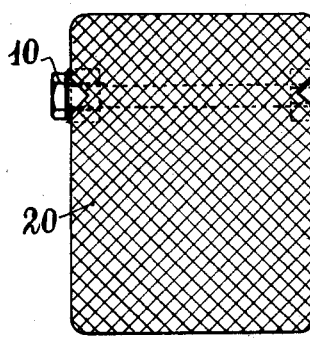
Figure 3 is a plan view of the same.

In the embodiment of Figures 2 and 3 said knob 3 is fastened on one end of a spring member 4 passing through an opening 5 provided in the said extension 2, and said spring 4 is in turn fastened on one edge of the extension 2.

Adjacent to the said opening 5 is fastened in the extension 2 a blade 6 of conducting material which is suitably insulated from the said extension; the respective position of the parts is such as in usual conditions the spring 4 is spaced apart from said blade 6.

To said blade 6 is connected a wire 7 (see Figure 1) which is in circuit with a warner and a storage battery (not shown) said circuit including in series said battery and warner and having one terminal connected with wire 7 and its other terminal connected with the metal mass of the vehicle.

When the driver moves his foot sidewise on the pedal plate 20, he causes the knob 3 to carry the spring 4 in contact with blade 6, the circuit being thus closed and the warner or other electric apparatus being put in operation, while the resiliency of said spring 4 causes it to move from said blade 6 as soon as the knob 3 is released by the driver's foot.

In the construction illustrated in Figures 2 and 3 the knob 3 has a larger size than the opening 5, in order to prevent the parts from being injured in the event the foot is applied on the said knob, because in such a case the pressure is supported by the wall of extension 2 and the spring 4 is not affected.

Figure 4:
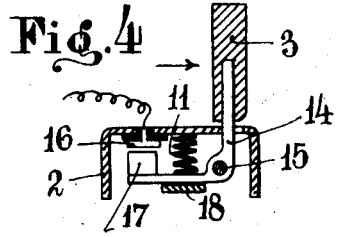
Figure 4 is a detail sectional view of a different construction of said contact member.

Figure 4 shows a construction in which a crank lever 14 is mounted to swing about a pivot pin 15 fastened in the extension 2, said lever 14 carrying the knob 3 above the extension 2 while on its other arm is arranged a contact piece 17 adapted to engage an insulated piece 16 fastened in said extension 2 and connected with wire 7; a spring 11 holds said lever in its position with its contact 17 removed from the contact 16 and a cross member 18 restricts the oscillation of lever 14. On a pressure being exerted on knob 3 in the direction of the arrow the contact piece 17 is carried in engagement with the contact piece 16 and the circuit is closed.

Figure 5:
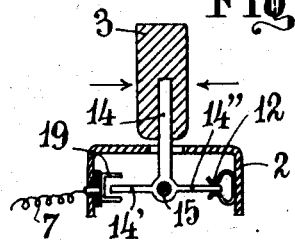
Figure 5 is a detail sectional view of a further modification.

In the construction of Figure 5 the lever 14 carrying the knob 3 is pivoted on the pivot pin 15 and it has two arms 14'—14" the first one being adapted to contact with either limb of an insulated fork piece 19 connected with wire 7, while its other arms 14" is resiliently engaged in a spring fork 12 which holds the said lever in its intermediate position with the end of its arm 14' spaced from both the limbs of said fork 19.

This construction provides for the actuation of the device in either direction, as shown by the arrows in Figure 5.

Of course the extension 2 may be provided or mounted in any desired manner on the pedal, a convenient arrangement being shown in Figures 1, 2 and 3; this arrangement comprises a screw threaded stud 8 projecting from a side of the extension 2 and a stationary hook member 9 adjacent to said extension, while a removable hook member 9' may be located on the end of the stud 8 to engage the edge of the pedal plate, said hook members being forced and clamped on the pedal plate edges by means of a nut 10 screwed on the stud 8.

What I claim as my invention and desire to secure by United States Letters Patent is:—

1. In a foot-operated switch for motor vehicles, the combination with a foot-pedal, of means to attach a switch thereto, said attaching means comprising a tie rod with means thereon to engage opposite edges of the foot pedal, said switch including a hollow casing having a flat upper surface and depending sides, a switch operator projecting above said upper surface, and a pivot for said operator on the depending sides of the casing and located substantially below the upper surface whereby a long leverage is obtained, and the operator is moved by a lateral pressure thereon.

2. In a signalling switch for motor vehicles, the combination with a foot-pedal, of a hollow switch casing, said casing having a flat upper surface and depending sides, clamping means attached to the casing and projecting beneath the foot-pedal, hooks on the clamping means for engaging the pedal, a switch operator projecting through an opening in the upper surface of the casing, and a pivot for said operator located substantially below the upper surface.

3. In a foot actuated control device for circuits of electric apparatus in motor vehicles, a supporting part, a member movable in said part, means for maintaining said member in a normal position, an insulated contact member fixed in said part and adapted to be connected with a pole of the electric circuit to be controlled, said contact member being contacted by said movable member when this latter is actuated by the foot, bars connected with said part and extending sidewise of the same, hook members on said bars adapted to engage the edges of a tread of a foot controlling lever of the vehicle and means for clamping together said hook members to fasten said supporting part on said tread.

In testimony whereof I have signed my name to this specification.

GIOVANNI VIGO.